Nov. 5, 1957

F. M. HARRIS

BUTTERFLY VALVE WITH A ROTATABLE
ECCENTRIC BEARING MOUNTING 2,811,981

Filed Jan. 26, 1953

INVENTOR
Florence Mary Harris
By Morris & Atteman
ATTORNEYS

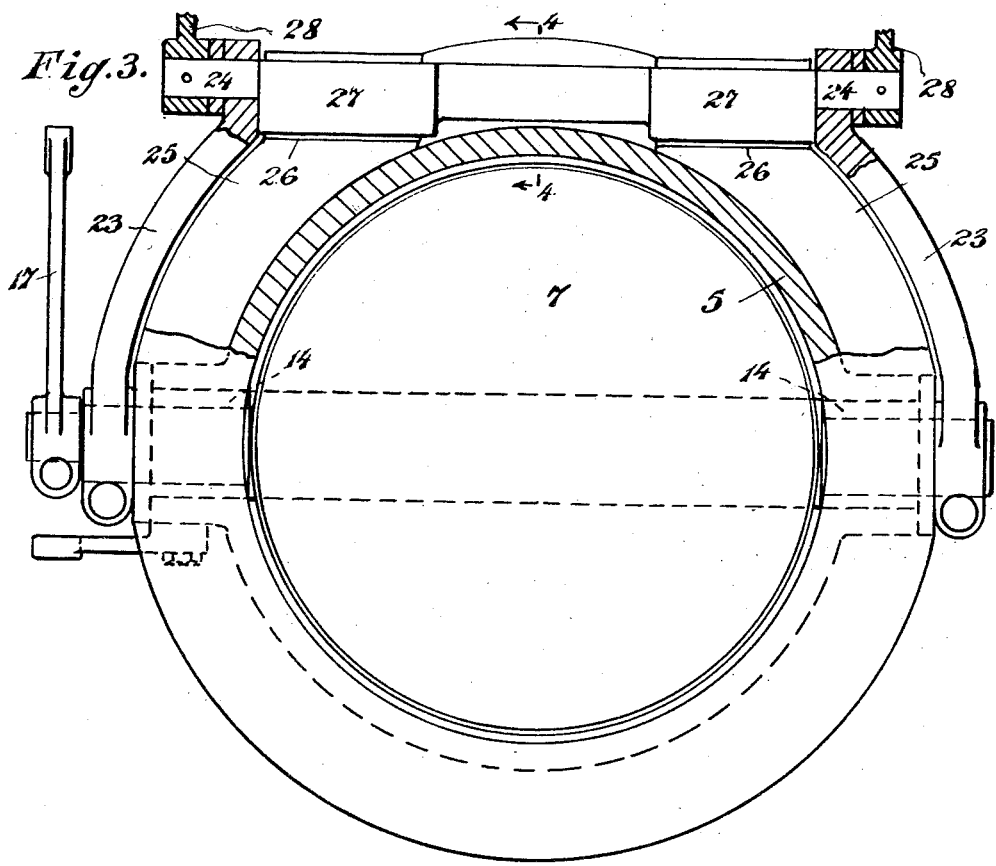
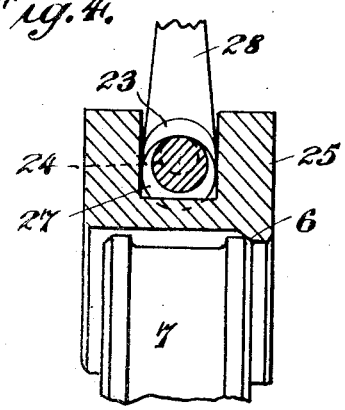

United States Patent Office 2,811,981
Patented Nov. 5, 1957

2,811,981

BUTTERFLY VALVE WITH A ROTATABLE ECCENTRIC BEARING MOUNTING

Florence Mary Harris, Kirby Muxloe, Leicester, England

Application January 26, 1953, Serial No. 333,097

4 Claims. (Cl. 137—340)

This invention relates to an improved valve of the kind incorporating a tubular valve body within which is a transverse spindle carrying a plate-like closure member formed of one or more parts and of substantially the same area as the cross sectional internal area of the tubular body, means being provided for rocking the closure member from a position in which it lies in a plane transverse to the tubular body and substantially closes the bore thereof to a position in which it is disposed substantially parallel to the axis of the said bore.

With valves of this kind, known as butterfly valves, which usually have a valve body of cylindrical form, it has been general practice to provide seatings for the closure member within the valve body which are presented in opposite directions relative to the axis of the body on opposite sides of a diametrically arranged spindle on which the closure member is mounted. With such valves it is difficult to obtain a pressure tight seal against an axial flow of gas within the valve body and it is the object of the present invention to overcome this disadvantage by providing a continuous seating on the interior of the valve body against which the closure member is adapted to seat, this seating in addition to providing in itself an enhanced sealing effect preventing rocking of the closure member until the latter is positively removed from the seating.

The invention consists of a valve of the kind referred to characterised by eccentric means whereby the closure member can be moved axially against a seating within the valve body.

A convenient embodiment of the present invention will now be described with particular reference to the accompanying drawings in which:

Fig. 3 is a part sectional end view of a modification of the valve seen in Fig. 1 and Fig. 4 is a section on the line 4—4 of Fig. 3.

Figure 1:
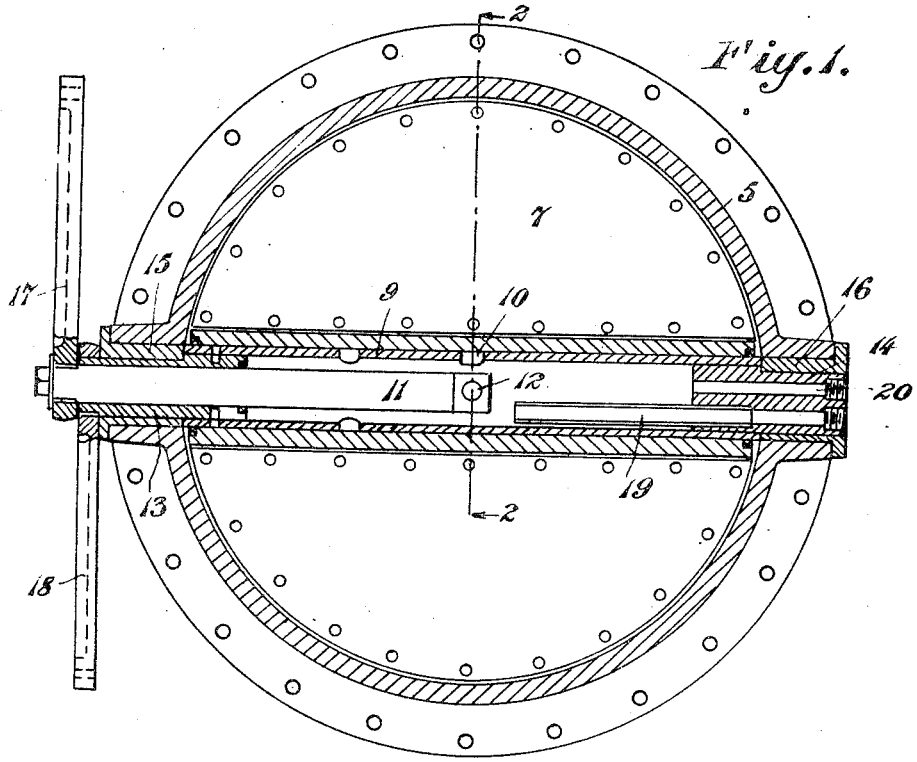
Fig. 1 is a sectional end view through a valve in accordance with the present invention.

The valve body 5 is of short cylindrical form adapted to be connected between two adjacent ends of two pipes of similar diameter. The valve body is furnished adjacent one end on its interior periphery with a truncated conical or part spherical seating 6 against which the closure member 7 is adapted to seat to close the valve. The closure member 7 takes the form of a circular disc which is of a diameter slightly less than the diameter of the main portion of the bore of the valve body 5 but is of greater diameter than the narrowest portion of the truncated conical seating 6 therein and is formed with a bevelled or part spherical edge 8 which is adapted to fit tightly against the seating 6. This closure member 7 is furnished with a diametrically extending bore within which is rotatably mounted a concentrically extending cylindrical sleeve 9 having a circumferentially extending slot 10 at its mid point through which the closure member 7 is keyed to a spindle 11 by a pin 12.

This spindle 11 is arranged concentrically within the tubular sleeve 9 and extends from the valve body through one of a pair of eccentric bearing sleeves 13 and 14 keyed within the opposite ends of the tubualr sleeve 9 and each having their eccentric portions located within fixed eccentric bearings 15 and 16 respectively in the valve body 5.

The part of the spindle 11 exterior to the valve body and the part of the one eccentric bearing sleeve 13 are furnished with radial arms 17 and 18 respectively. Turning the radial arm 17 on the spindle will effect a rocking of the closure member 7 about the sleeve 9 through 90° between a position in which its plane is transverse to the axis of the body and a position in which its plane is parallel to the axis of the valve body. Turning of the arm 18 mounted on the bearing sleeve 13 through a permitted angle of say 6° effects a turning of the eccentric bearing sleeves 13 and 14 and the tubular sleeve 9 to impart a slight axial movement to the closure member 7 within the body towards or away from the seating 6.

When a truncated conical seating 6 is employed, the angle selected is preferably at a tangent to the curvature through which the closure member turns.

It will be understood that when the closure member 7 is disposed substantially parallel to the axis of the valve body and it is desired to close the valve, the closure member 7 is first rocked by moving the radial arm 17 until the plane of the closure member is disposed transverse to the axis of the valve body whereupon the radial arm 18 is turned through an angle of approximately 6° so as to move the closure member 7 axially within the body to bring the bevelled edges 8 thereof into engagement with the seating 6 of the valve body. In order to open the valve the closure member 7 is first moved axially from the seating 6 by the arm 18 and then turned through 90° by movement of the radial arm 17. Desirable means, not shown, is provided for ensuring that the two arms 17 and 18 are moved in the requisite order. When the valve is employed as a relief valve, the arm 17 on the spindle may be weighted or spring loaded to ensure rapid valve opening immediately following the initial opening of the valve by the arm 18 on the eccentric sleeve.

Where the valve is to be used in positions in which it is likely to be raised to a high temperature the closure member 7 is of hollow construction and the eccentric sleeve 14 is furnished with two passageways 19 and 20 for the inlet and discharge respectively of a cooling medium to the interior of the tubular sleeve 9 which is in communication with water jackets in the two semi-circular portions of the closure member 7 on either side of the bore through passageways 21. These water jackets are formed by cavities in the face of the closure member opposite the seating 6 which cavities are closed by cover plates 22 bolted over the cavities.

Figure 2:
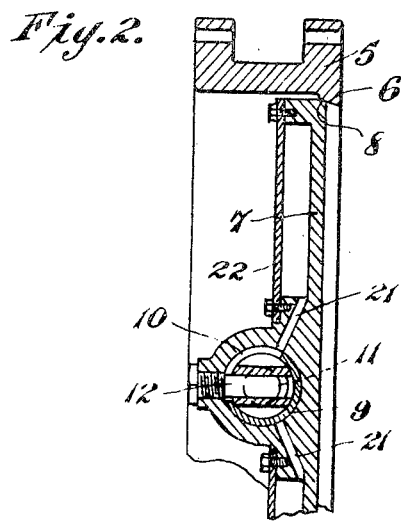
Fig. 2 is a section on the line 2—2 of Fig. 1.

Describing now the modification shown in Figs. 3 and 4 on which parts similar to those shown in Figs. 1 and 2 are designated with like reference numerals, it will be seen that both eccentric bearing sleeves 14 project from the valve body 5 and have connected to their outer ends two similar arms 23 which take the place of the arm 18 in Figs. 1 and 2. The upper ends of the arms 23 are disposed about a shaft 24 disposed tangentially relative to the housing 5 and located between the pair of flanges 25 on the valve body these flanges being extended as shown at 26 to provide bearing faces which embrace a pair of eccentrics 27 formed on the shaft 24. The eccentrics 27 are of a diameter substantially equal to the distance between the flanges 25 and their extensions 26 on the valve body and the shaft 24 at one end is furnished with a handle 28 whereby the shaft and eccentrics may be rotated. The handle 28 is shown in the drawings in its midway position and is adapted to be rocked from the position shown to positions at 90° thereto on either side. It will be understood that in either of these extreme positions in which the axis of the handle 28 lies horizontally, the axis of maximum eccentricity of the eccentrics 27 will be at right angles to the bearing faces 26 of the flanges 25 to provide a self-locking effect upon the handle 28 and thereby prevent turning thereof. The turning of the handle 28 through 180° from one extreme to the other is designed to impart a 6° angular movement to the arm 23 and the eccentric bearing sleeves 14 to impart the slight axial movement to the closure member 7 towards and away from the seating 6 as described with reference to Figs. 1 and 2.

I claim:

1. A valve comprising a valve body having a passage extending therethrough and surrounded by a valve seat, a sleeve extending diametrically across the passage in the valve body and having portions at both of its ends eccentric to the axis of the sleeve and mounted rotatably in the valve body at opposite sides thereof, said sleeve rigidly connecting its eccentric portions for rotation in unison, a closure member having a diameter greater than that of the valve seat but less than that of the passage in the valve body and mounted rotatably on the sleeve for movement bodily by rotation of the sleeve and its eccentric portions in parallelism with the axis of the passage in the valve body to and from engagement with the valve seat, a shaft connected to the closure member for rotating it on said sleeve and thereby swinging the closure member from a plane transverse to the passage in the valve body to a plane substantially parallel to said passage while the closure member is disengaged from the valve seat, means connected to the sleeve for rotating it on its eccentric portions to move the closure member bodily in the direction of the axis of the passage in the valve body to or from engagement with the valve seat, and means connected to said shaft for swinging the closure member from the plane transverse to the axis of said passage to a plane substantially parallel therewith.

2. A valve as defined in claim 1, wherein said closure member is hollow, and said sleeve has means of communication with the hollow closure member and is provided with means for supplying a coolant to and discharging it from the sleeve and hollow closure member.

3. A valve comprising a valve body having a passage extending therethrough and surrounded by a valve seat, a sleeve extending transversely across the passage in the valve body and having portions fixed to its ends and eccentric to the axis of the sleeve and projecting beyond opposite sides of the valve body, bearings mounted in opposite sides of the valve body and having the respective eccentric portions of the sleeve mounted rotatably therein, a closure member having a diameter greater than that of the valve seat but less than that of the passage in the valve body, said sleeve extending diametrically across the closure member and the closure member being mounted rotatably on the sleeve for movement bodily by rotation of the sleeve and its eccentric portions in parallelism with the axis of the passage in the valve body to and from engagement with the valve seat, a shaft connected to the closure member for rotating it on said sleeve to swing the closure member from a plane transverse to a plane substantially parallel to the axis of said passage while the closure member is disengaged from the valve seat, a pair of arms rigidly connected respectively to the eccentric end portions of the sleeve projecting from the sides of the valve body, relatively opposed bearing faces in fixed positions on the valve body, a cam shaft to which said pair of arms are connected and having cams thereon positioned between and cooperative with said bearing faces on the valve body to swing said pair of arms simultaneously to rotate the sleeve and thereby rotate the eccentric portions of the sleeve in unison to move the closure member bodily in the direction of the axis of the passage in the valve body, and means connected to said shaft connected to the closure member for swinging the closure member on the sleeve.

4. A valve as defined in claim 3, wherein said bearing faces on said valve body comprise relatively spaced flanges, and the cams on said cam shaft are eccentrics located between said flanges and cooperate therewith to swing said pair of arms into one or another position to move the closure member into engaged or disengaged position relatively to the valve seat, and said eccentrics are rotatable into one or another position with their axis of maximum eccentricity at right angles to the bearing faces on said flanges to thereby lock the closure member in one or the other of said positions.

References Cited in the file of this patent

UNITED STATES PATENTS

| 1,213,513 | Lohse | Jan. 23, 1917 |
| 1,656,183 | Enz | Jan. 17, 1928 |
| 1,669,119 | Bliss | May 8, 1928 |
| 1,904,467 | Karnath | Apr. 18, 1933 |
| 2,517,596 | Parducci | Aug. 8, 1950 |

FOREIGN PATENTS

| 373,478 | Great Britain | of 1932 |
| 785,155 | France | of 1935 |